US012404779B1

(12) United States Patent
Burdgick et al.

(10) Patent No.: US 12,404,779 B1
(45) Date of Patent: Sep. 2, 2025

(54) AXIALLY ADJUSTABLE INSERTED RING WITHIN PACKING RING AND METHOD OF USING SAME

(71) Applicant: GE Infrastructure Technology LLC, Greenville, SC (US)

(72) Inventors: Steven Sebastian Burdgick, Schenectady, NY (US); Mark W. Kowalczyk, Amsterdam, NY (US); John M. Sassatelli, Valley Falls, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/581,641

(22) Filed: Feb. 20, 2024

(51) Int. Cl.
*F01D 11/00* (2006.01)

(52) U.S. Cl.
CPC ........ *F01D 11/003* (2013.01); *F05D 2240/59* (2013.01); *F05D 2260/38* (2013.01)

(58) Field of Classification Search
CPC ...... F16J 15/442; F16J 15/445; F16J 15/4472; F16J 15/441; F16J 15/002; F16J 15/3268; F01D 11/001; F01D 11/02; F01D 11/025; F01D 11/003; F01D 11/005; F01D 11/122; F01D 5/225; F01D 11/06; F01D 11/22; F01D 25/24; F01D 11/10; F01D 11/08; F01D 11/16; F01D 11/18; F01D 25/246; F01D 9/04; F01D 11/00; F01D 11/04; F01D 11/12; F01D 11/127; F01D 11/14; F01D 11/20; F01D 11/24; F01D 25/26; F05D 2240/56; F05D 2220/31; F05D 2240/55;

(Continued)

(56) References Cited

U.S. PATENT DOCUMENTS 5,374,068 A * 12/1994 Jewett .................... F16J 15/441
277/303
5,971,400 A * 10/1999 Turnquist ............... F16J 15/442
277/421

(Continued)

FOREIGN PATENT DOCUMENTS

JP 2002070505 A 3/2002
JP 2012102645 A 5/2012

(Continued)

OTHER PUBLICATIONS

Machine Translation of JP 2013167221A [retrieved on Oct. 9, 2024]. Retrieved from: Espacenet. (Year: 2024).*

*Primary Examiner* — Eric J Zamora Alvarez
(74) *Attorney, Agent, or Firm* — Armstrong Teasdale LLP

(57) ABSTRACT

A turbine assembly including a turbine stationary component, which includes an inner ring and a packing segment positioned relative to the inner ring such that a steam joint is defined therebetween. The packing segment defines a groove open to the steam joint, a first seal face within the groove and opposite from the portion open to the steam joint, and a second seal face within the groove and adjacent to the first seal face. An inserted ring includes a body having a first face, a second face adjacent to the first face, and a third face opposite from the first face. The first face is positioned in close proximity to the first seal face of the packing segment, the second face is positioned in close proximity to the second seal face of the packing segment, and the third face is positioned in close proximity to the inner ring.

20 Claims, 11 Drawing Sheets

(58) Field of Classification Search
CPC ............. F05D 2230/80; F05D 2240/11; F05D 2240/57; F05D 2240/59; F05D 2240/70; F05D 2220/32; F05D 2230/64; F05D 2230/644; F05D 2260/38; F05D 2260/6022; F02C 7/28
See application file for complete search history.

(56) References Cited

U.S. PATENT DOCUMENTS

| | | | | |
|---|---|---|---|---|
| 6,065,754 | A * | 5/2000 | Cromer | F01D 11/025 277/412 |
| 6,250,641 | B1 * | 6/2001 | Dinc | F16J 15/3288 277/355 |
| 6,550,777 | B2 * | 4/2003 | Turnquist | F16J 15/3288 277/412 |
| 7,052,017 | B2 * | 5/2006 | Uchida | F16J 15/4472 277/420 |
| 7,066,470 | B2 * | 6/2006 | Turnquist | F04D 29/102 277/355 |
| 7,384,235 | B2 * | 6/2008 | Adis | F01D 11/001 277/413 |
| 7,704,041 | B2 * | 4/2010 | Adis | F01D 11/003 277/421 |
| 7,731,478 | B2 * | 6/2010 | Chevrette | F16J 15/442 415/173.5 |
| 7,748,945 | B2 * | 7/2010 | Johnson | F16J 15/4472 415/12 |
| 8,113,771 | B2 * | 2/2012 | Turnquist | F16J 15/445 277/411 |
| 8,327,752 | B2 * | 12/2012 | Varanasi | F15B 15/1452 92/165 PR |
| 8,540,479 | B2 * | 9/2013 | Awtar | F01D 11/122 415/113 |
| 9,382,813 | B2 * | 7/2016 | Reid | F01D 11/003 |
| 10,746,040 | B2 * | 8/2020 | Nogami | F01D 11/003 |

FOREIGN PATENT DOCUMENTS

| | | |
|---|---|---|
| JP | 2013167221 A | 8/2013 |
| JP | 05509037 B2 | 6/2014 |

* cited by examiner

Detail 1

A-A

Steam Pressure

AXIALLY ADJUSTABLE INSERTED RING WITHIN PACKING RING AND METHOD OF USING SAME

BACKGROUND OF THE INVENTION

The present disclosure relates generally to an inserted ring used in rotating machinery and, more particularly, relates to methods of adjusting such inserted rings within a packing ring in the axial direction.

Rotary machines, such as steam and gas turbines used for power generation and mechanical drive applications, are generally large machines that include multiple turbine stages. High-pressure fluid flowing through these stages must pass through a series of adjoining stationary and rotating components. Seals between the stationary and the rotating components are used to control fluid leakage.

Over time, the stationary and the rotating components, for example, a packing ring, may require refurbishment and/or replacement to enable the associated rotary machine to continue to operate efficiently. The refurbishment can include, but is not limited to, repairing the packing ring seal face. This is typically referred to as the "steamface" or "seal face", which is located between the packing ring and the inner ring axial downstream interface. Presently, frequently the component requiring refurbishment must be removed from operation to enable it to be analyzed and/or repaired as necessary. However, removing the component from operation costs time and money, especially in the power generation industry where an outage is often further penalized and may require replacement power to be purchased, for example.

Accordingly, there exists a need for a method of refurbishing a component used in rotating machinery, wherein the method efficient and facilitates limiting downtime of the rotating machinery.

BRIEF DESCRIPTION OF THE INVENTION

In one aspect, an inserted ring for a turbine assembly, wherein the turbine assembly includes a turbine stationary component, the turbine stationary component includes an inner ring and a packing segment positioned relative to the inner ring such that the inner ring and the packing segment define a steam joint therebetween. The inserted ring includes a first face positioned adjacent to the inner ring; and a second face positioned in close proximity to the packing segment such that the second face is spaced a distance from and opposite to the first face, wherein the inserted ring has an axial width defined by the first and second faces.

In another aspect, a turbine assembly including an inner ring and a packing segment positioned relative to the inner ring such that a steam joint is defined therebetween. The packing segment defines a groove open to the steam joint, the packing segment defines a first seal face within the groove and opposite from the portion open to the steam joint, and a second seal face within the groove and adjacent to the first seal face. An inserted ring includes a body having a first face, a second face adjacent to the first face, and a third face opposite from the first face. The first face is positioned in close proximity to the first seal face of the packing segment, the second face is positioned in close proximity to the second seal face of the packing segment, and the third face is positioned in close proximity to the inner ring.

In yet another aspect, a method for selectively positioning an inserted ring relative to a turbine assembly that includes an inner ring and a packing segment positioned relative to the inner ring such that the inner ring and the packing segment define a steam joint therebetween. The method includes identifying a seal position required at a packing seal location and identifying an axial width defined between a first seal face of the packing segment and a radially inner surface of the inner ring. The method includes selecting an inserted ring having an axial width that is approximately the same as the axial width identified between the first seal face of the packing segment and the radially inner surface of the inner ring. The method includes inserting the inserted ring at least partially within a groove defined circumferentially within the packing segment. The method includes fixedly securing the inserted ring within the groove of the packing segment to facilitate improving the operating efficiency of the turbine assembly.

DETAILED DESCRIPTION OF THE INVENTION

The embodiments described herein relate to systems and methods that enable axial adjustment of an inserted ring/pin used in rotating machinery. At least some of the advantages of the systems described herein, over the prior art, include, at least: (i) selective adjustments of the axial position of the inserted ring/pin; (ii) incremental adjustments of the inserted ring/pin for ease of repair; (iii) reduced downtime of the rotating machinery; and (iv) reduced analysis required to select an appropriate inserted ring/pin based on a determined axial width between components of the rotating machinery.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, spatially relative terms, such as "beneath", "below", "lower", "above", "upper", "front", "back", "side", "left", "right", "rear", "top", "bottom", and the like, are used for ease of description to describe one element or feature's relationship to another element(s) or feature(s). It is further understood that the terms "front", "back", "left", and "right" are not intended to be limiting and are intended to be interchangeable, where appropriate. Further, it should be noted that the terms "first," "second," and the like herein do not denote any order, quantity, or relative importance, but rather are used to distinguish one element from another.

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

Figure 1:
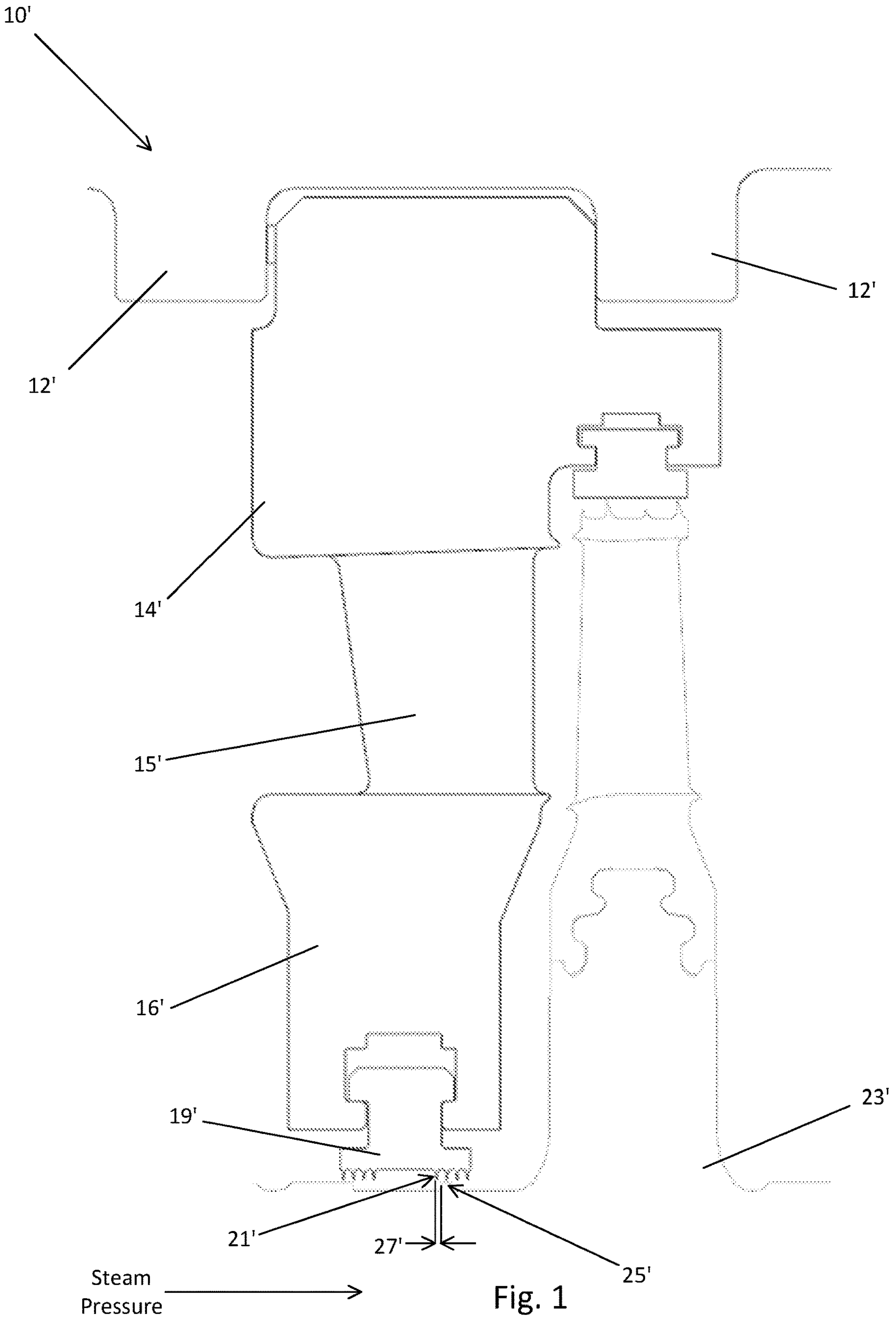
Fig. 1 PRIOR ART
FIG. 1 is a prior art cross-sectional illustration of a portion of a steam turbine assembly.

FIG. 1 is a cross-sectional schematic view of a prior art version of a steam turbine assembly 10'. The steam turbine assembly 10' includes a casing 12' and a diaphragm outer ring 14' positioned relative to the casing 12'. The steam turbine assembly 10' includes a nozzle 15' and an inner ring 16' positioned in proximity to the diaphragm outer ring 14'. The steam turbine assembly 10' includes a turbine stationary component including a packing ring 19' that is positioned in proximity to the inner ring 16'. The packing ring 19' defines one or more protrusions 21' that extend outwardly and in the direction of opposing protrusions 25' of a rotor 23'.

Figure 2:
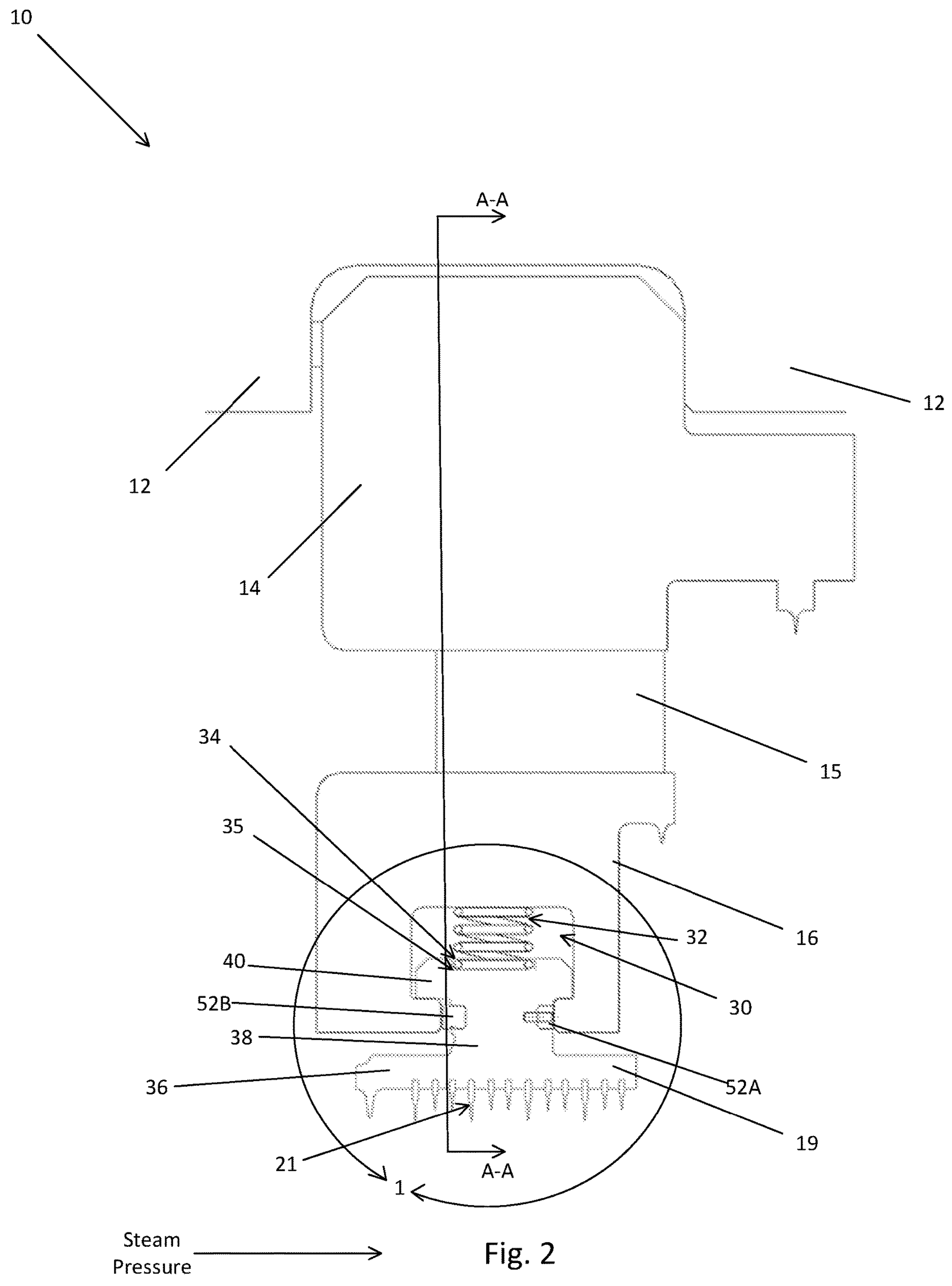
FIG. 2 is a cross-sectional illustration of a portion of an exemplary steam turbine assembly including two inserted rings and a radial spring.
Figure 3:
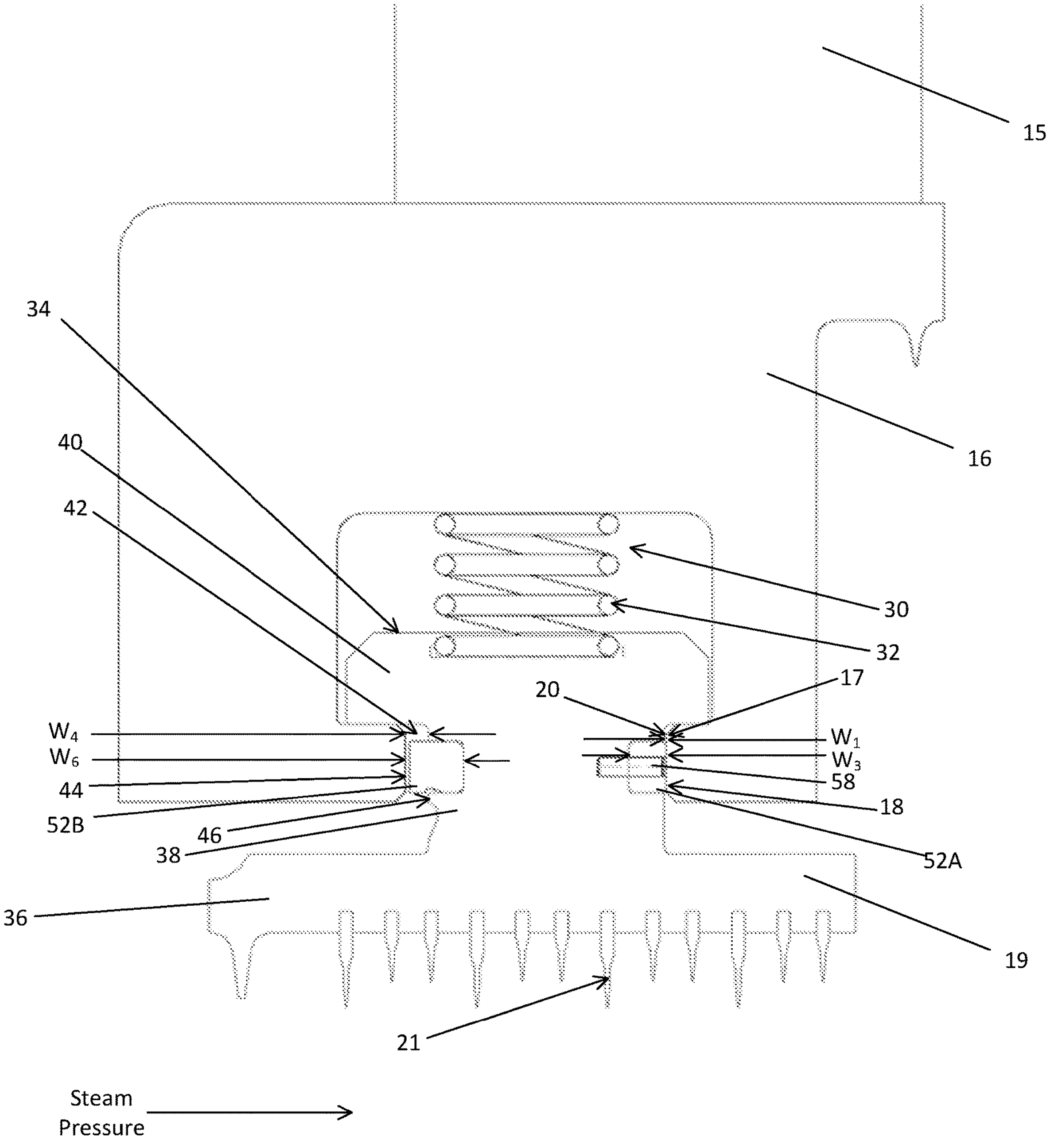
FIG. 3 is an enlarged cross-sectional view of the steam turbine assembly shown in FIG. 2 and taken within detail 1.

FIG. 2 is a cross-sectional schematic view of an exemplary steam turbine assembly 10. In the exemplary embodiment, assembly 10 includes a casing 12 and a turbine stationary component 14 positioned relative to the casing 12. The turbine stationary component 14 may include, but is not limited to, a diaphragm outer ring, a packing head, a packing ring, a packing carrier, an oil deflector, and/or variations thereof. The steam turbine assembly 10 includes a nozzle 15 and an inner ring 16 positioned in proximity to the diaphragm outer ring 14. More specifically, the nozzle 15 is between the diaphragm outer ring 14 and the inner ring 16. The steam turbine assembly 10 includes the turbine stationary component including 14 that further includes a packing ring 19 that is positioned in proximity to the inner ring 16. The packing ring 19 may be referred to as a packing segment 19. In some embodiments, the packing ring 19 may be coupled directly with the casing 12 or with the turbine stationary component 12. The inner ring defines a channel 30 that extends in a direction away from the packing ring 19. The channel 30 may extend a distance relative to the inner ring 16. For example, the distance of the channel 30 may be equal to or less than the circumferential distance of the inner ring 16. The channel 30 may be sized and shaped to receive, at least partially, a biasing member 32, such as, a radial spring, a coil spring, a leaf spring. As depicted in FIGS. 2 and 3, The radial spring 32 may be in direct or indirect contact with the packing ring 19. For example, the radial spring 32 may be in direct or indirect contact with a first surface 34 of the packing ring 19 such that the radial spring 32 is in contact with the inner ring 16 and the packing ring 19. The radial spring 32 is partially positioned within a recessed portion 35 relative to the first surface 34 of the packing ring 19. In some instances, two or more radial springs 32 may be used. Although the biasing member 32 is depicted as a radial spring, it should be understood that any biasing member 32 may be used, unless expressly stated otherwise.

Figure 10:
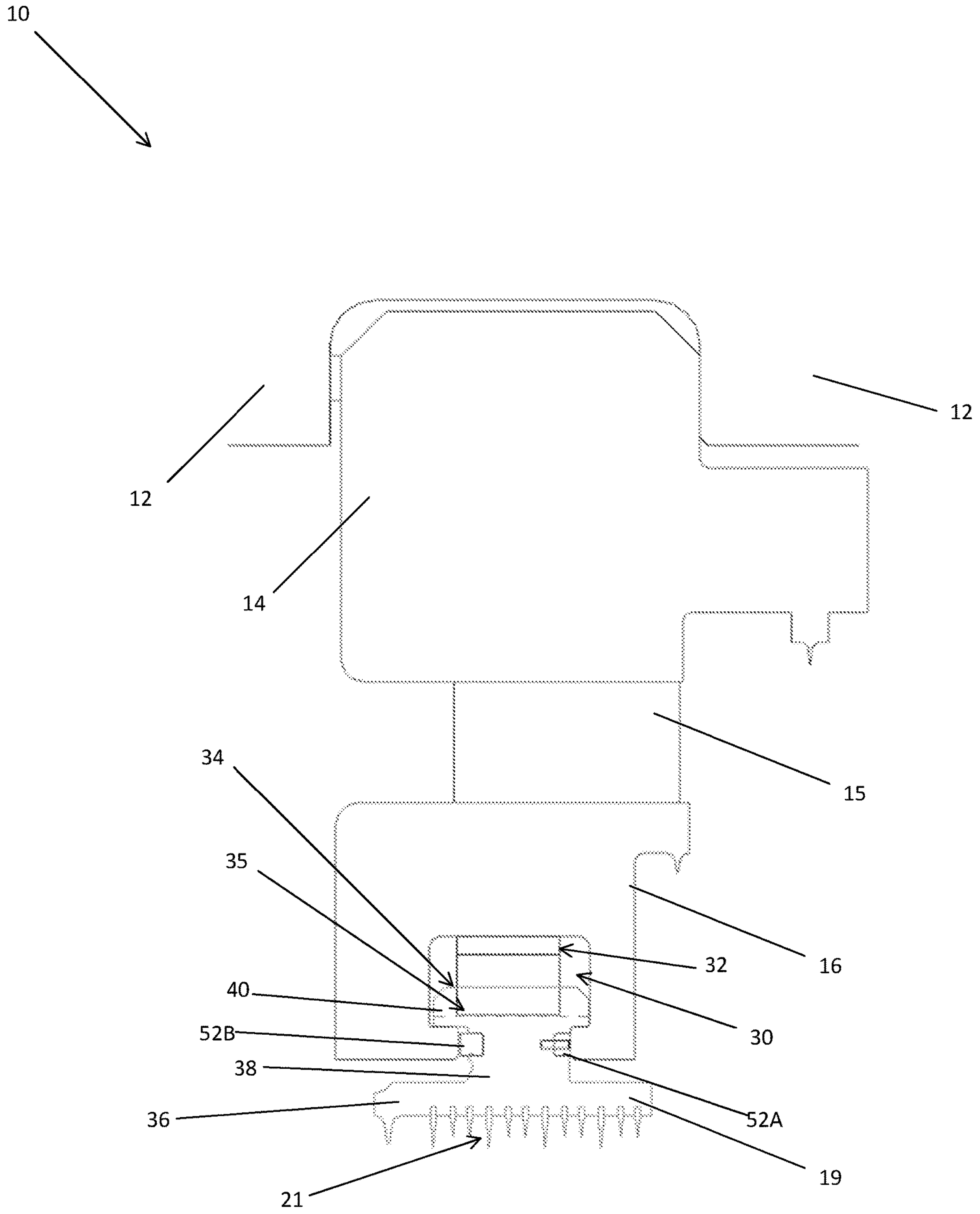
FIG. 10 is a cross-sectional illustration of a portion of the exemplary steam turbine assembly shown in FIG. 2 including two inserted rings and a leaf spring.
Figure 11:
FIG. 11 is a side view illustration of the leaf spring shown in FIG. 10.

In a non-limiting example, the biasing member 32 may be a leaf spring, as depicted in FIGS. 10 and 11. The leaf spring 32 may be in direct or indirect contact with the packing ring 19. For example, the leaf spring 32 may be in direct or indirect contact with the first surface 34 of the packing ring 19 such that the radial spring 32 is in contact with the inner ring 16 and the packing ring 19. The leaf spring 32 is partially positioned within the recessed portion 35 relative to the first surface 34 of the packing ring 19. The leaf spring 32 includes a curved feature 33. The curved feature 33 is sized and shaped to at least partially fit within the recessed portion 35 of the packing ring 19. At least the curved feature 33 of the leaf spring 32 reacts against the inner diameter of the recessed portion 35 to impart a radial inward force on the packing ring 19. In some instances, two or more leaf springs 32 may be used.

The packing ring 19 includes a base segment 36, which is coupled to a neck segment 38, which is coupled to a hook base segment 40. The hook base segment 40 defines the first surface 34 that is positioned relative to the channel 30 of the inner spring 16. It should be understood that although the packing ring 19 is described with reference to multiple segments, the packing ring 19 may be one component, for example, as shown in the figures. The packing ring 19 includes protrusions 21 that extend outwardly from the base segment 36 in a direction away from the first surface 34. The protrusions correlate with the protrusions 21' as depicted in prior art FIG. 1. Although a steam turbine assembly 10 is illustrated, it should be understood that the following may apply to other turbine assemblies, including gas turbine assemblies.

FIG. 3 is a cross-sectional schematic view of the steam turbine assembly 10 including an enlarged view depicting the relationship between inner ring 16 and the packing ring 19. In an exemplary embodiment, the inner ring 16 and the packing ring 19 define a steam joint 17 that is within the steam flow path and is thus exposed to steam pressure. The steam joint 17 may be also referred to as a downstream joint, as the steam joint 17 is downstream based on the direction of the steam pressure. The steam joint 17 is defined by a surface 18 of the inner ring 16 and by a steam face 20 of the packing ring 19 that is opposite the inner ring surface 18. The steam face 20 is the axial interface between the packing ring 19 and the inner ring 16 that counteracts the axial pressure induced to the nozzle 15.

The axial width $W_1$ of the steam joint 17 can vary based upon a variety of factors, including but not limited to, the size of the steam turbine assembly 10, "dishing" of the packing ring 19, and combinations thereof. The term “dishing” is used to describe creep deformation that may form within a web portion (not shown) of the packing ring 19. In some instances, the axial width $W_1$ may have a range between about 0 inches “in” and about 0.25 in.

In another exemplary embodiment, the inner ring 16 and the packing ring 19 define a joint 42 that is upstream from the steam joint 17 based on the direction of the steam pressure. The joint 42 is defined by a surface 44 of the inner ring 16 and by a surface 46 of the packing ring 19 that is opposite the inner ring surface 44. The packing ring surface 46 is the axial interface between the packing ring 19 and the inner ring 16 that counteracts the axial pressure induced to the nozzle 15.

The axial width $W_4$ of the joint 42 can vary based upon a variety of factors, including but not limited to, the size of the steam turbine assembly 10, “dishing” of the packing ring 19, and combinations thereof. In some instances, the axial width $W_4$ may have a range between about 0 inches “in” and about 0.25 in.

It should be understood that although the axial width $W_1$ is illustrated as being smaller than the axial width $W_4$, the disparity between the two axial widths $W_1$, $W_4$ is not intended to be limiting. Thus, axial width $W_1$ may be larger than, equal to, or smaller than axial width $W_4$. Similarly, axial width $W_4$ may be larger than, equal to, or smaller than axial width $W_1$.

Figure 4:
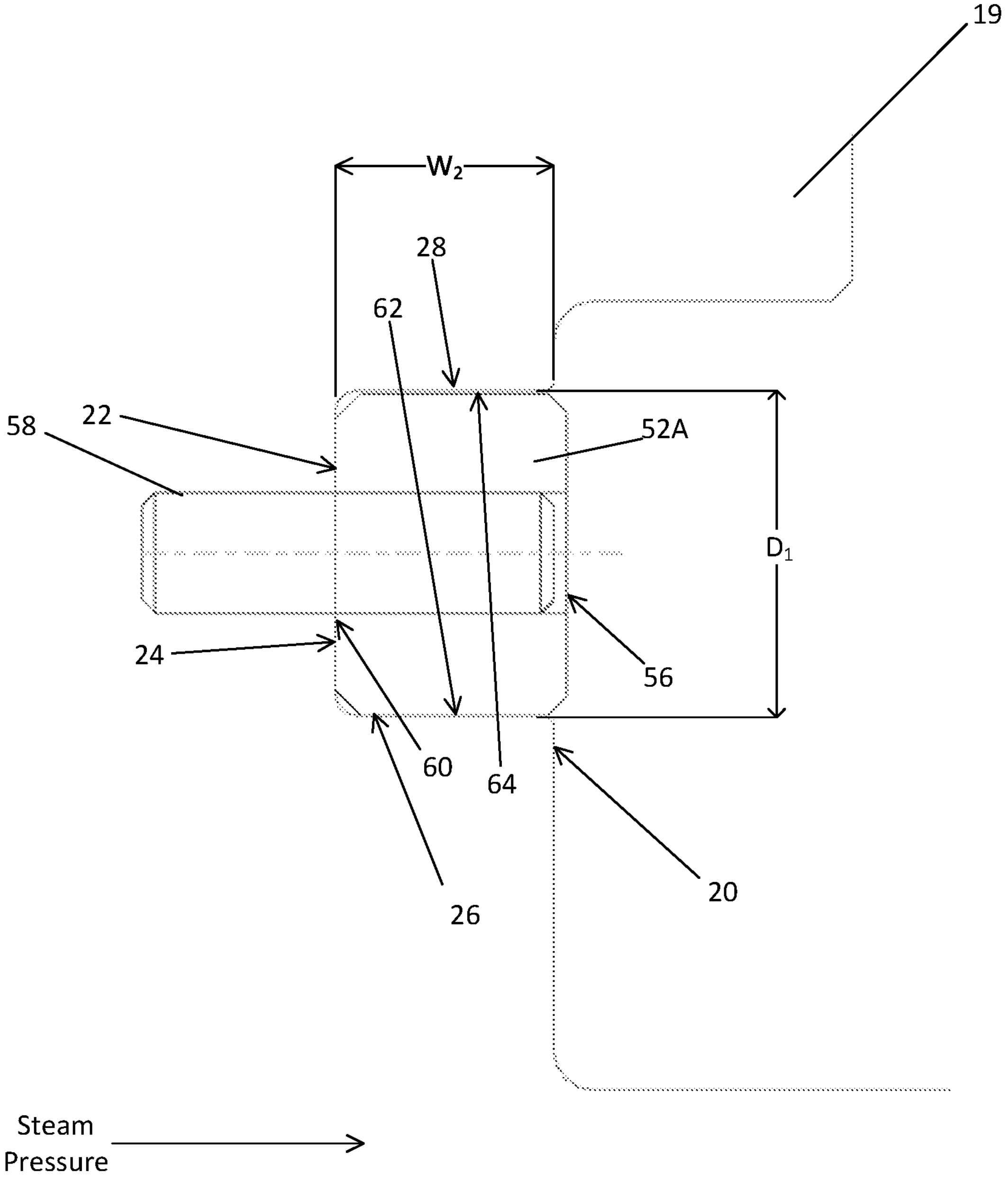
FIG. 4 is an enlarged cross-sectional illustration of a packing ring of the steam turbine assembly shown in FIG. 2 with a first of the inserted rings.

In some embodiments, the packing ring 19 includes a first groove 22 defined therein that is formed relative to the inner ring 16. The first groove 22 is open to the steam joint 17, as best seen in FIG. 4. The packing ring 19 includes a first seal face 24 that is defined opposite the steam joint 17. The packing ring 19 defines a second seal face 26 that is adjacent to the first seal face 24. The packing ring 19 also includes a third face 28 that is defined opposite the second seal face 26. The first seal face 24, the second seal face 26, and the third face 28 define, at least in part, the first groove 22.

The first groove 22 has an axial width $W_2$ that is measured between the steam face 20 of the packing ring 19 and the opposite first seal surface 24 of the packing ring, as best seen in FIG. 4. In some instances, the axial width $W_2$ may be between about 0.25 inches “in” to about 0.50 in. The first groove 22 has an axial width $W_3$ that is measured between the inner ring surface 18 and the first seal surface 24 of the packing ring 19. In some instances, the radial axial width $W_3$ may be between about 0.25 inches “in” to about 0.50 in.

Figure 5:
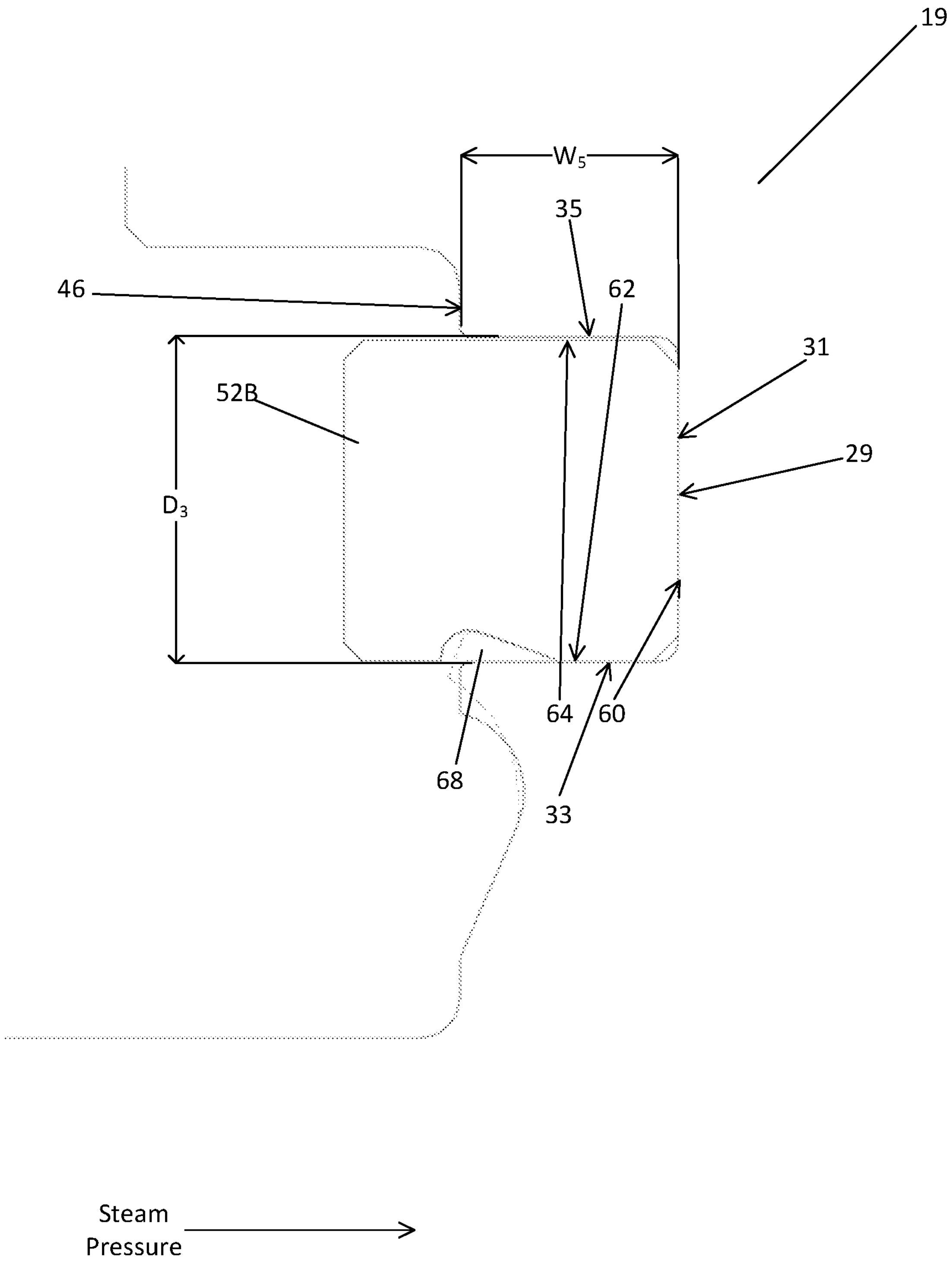
FIG. 5 is an enlarged cross-sectional illustration of the packing ring of the steam turbine assembly shown in FIG. 2 with a second of the inserted rings.

In some embodiments, the packing ring 19 includes a second groove 29 defined therein that is formed relative to the inner ring 16. It should be understood that first and second are merely to differentiate the two grooves 22, 29 to ensure the description is easy to follow. The labeling of first and second in no way requires one groove to be part of the system without the other. The second groove 29 is open to the joint 42. The packing ring 19 includes a first seal face 31 that is defined opposite the joint 42. The packing ring 19 defines a second face 33 that is adjacent to the first seal face 31, as best seen in FIG. 5. The packing ring 19 also includes a third seal face 35 that is defined opposite the second face 33. The first seal face 31, the second face 33, and the third seal face 35 define, at least in part, the second groove 29.

The second groove 29 has an axial width $W_5$ that is measured between the surface 46 of the packing ring 19 and the opposite first seal surface 31 of the packing ring 19, as best seen in FIG. 5. In some instances, the axial width $W_5$ may be between about 0.25 inches “in” to about 0.50 in. The second groove 29 has an axial width $W_6$ that is measured between the inner ring surface 46 and the first seal surface 31 of the packing ring 19. In some instances, the radial axial width $W_6$ may be between about 0.25 inches “in” to about 0.50 in.

It should be understood that the first groove 22 and the second groove 29 may define axial widths $W_2$, $W_5$, respectively, that are equal to each other or different from each other. Similarly, the axial widths $W_3$, $W_6$ may be equal to each other or different from each other. In some embodiments, the packing ring 19 may include both the first groove 22 and the second groove 29. In other embodiments, the packing ring 19 may include one of the first groove 22 or the second groove 29.

In some instances, the first groove 22 and/or the second grooves 29 may be formed at the time of refurbishment to correct, for example, downstream deflection (dishing) at the shaft packing seal location of the packing ring 19. In other instances, the first groove 22 and/or the second grooves 29 may be formed before or after refurbishment, for example, when the steam turbine assembly 10 is originally manufactured.

In the exemplary embodiment, the steam turbine assembly 10 includes an inserted ring 52 that is sized and shaped to be inserted at least partially within the first and second grooves 22, 29, either directly or indirectly. The inserted ring 52 is of a standard-size wherein inserted rings 52 are manufactured with various incremental sizes that may be combined to increase the overall size. Similarly, portions of the inserted ring 52 may be removed to reduce the overall size. The term “size” is not limited to a diameter, but may also include, but is not limited to only including, the thickness, the width, and/or combinations thereof. The size may be measured relative to the inserted ring 52 and/or may be based on a radial dimension from an axis (e.g., a longitudinal axis). In some embodiments, a first inserted ring 52A is sized and shaped to be inserted at least partially within the first groove 22, either directly or indirectly. A second inserted ring 52B is sized and shaped to be inserted at least partially within the second groove 29, either directly or indirectly. The first inserted ring 52A and the second inserted ring 52B may be collectively referred to as reference number 52 and distinguishing between the two inserted rings 52 enables a more thorough explanation of the steam turbine assembly 10. It does not, however, inherently indicate differences between the inserted rings 52, unless otherwise expressly stated.

Figure 6:
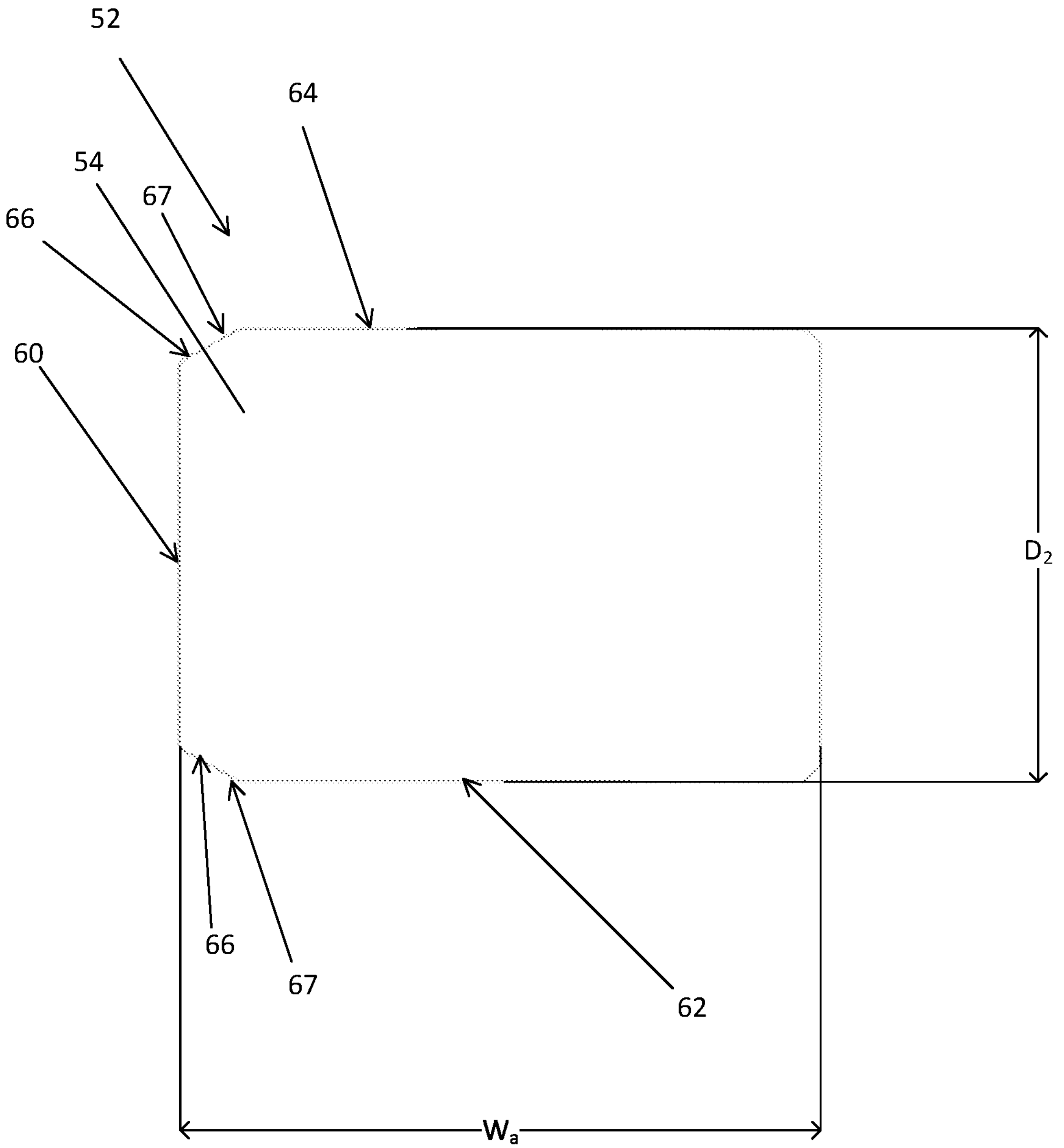
FIG. 6 is an enlarged cross-sectional illustration of an exemplary inserted ring that may be used with the steam turbine assembly shown in FIG. 2.

Referring to FIG. 6, the inserted ring 52 has a body 54 that has an axial width $W_a$. The axial width $W_a$ of the inserted ring 52 may vary based on the application and may be incrementally sized. The desired axial width $W_a$ of the body 54 of the inserted ring 52 may be selected prior to installation within the first groove 22 and/or the second groove 29. The body 54 of the inserted ring 52 includes a first seal face 60 and a second seal face 62. The first and second seal faces 60 and 62 are adjacent to each other. In some embodiments, the second seal face 62 may be a second face 62. The body 54 includes a third face 64 that is opposite the second seal face 62. The third face 64 in some embodiments may be a third seal face 64. The body 54 may also include a defined angled feature 66 in one or more corners 67 relative to the first seal face 60, the second seal face 62 and/or the third face 64. Additional modifications to the inserted ring 52 beyond what is shown in FIG. 6 are anticipated, such as, including a through hole along the longitudinal axis (FIG. 4).

Referring to FIGS. 3 and 4, the first inserted ring 52A may be sized and shaped to be at least partially inserted within the groove 22 of the packing ring 19. The distance $D_1$ between the second seal face 26 and the third face 28 of the first groove 22 may be equal to or larger than a distance $D_2$ measured between the second seal face 62 and the third face 64 of the first inserted ring 52A (see, e.g., FIG. 6). The distance $D_2$ between the second seal face 62 and the third face 64 of the inserted ring 52 may be about the same as, or smaller than, the distance $D_1$ between the second seal face 26 and the third face 28 of the first groove 22. The first inserted ring 52A may have an axial width $W_a$ (see, e.g., FIG. 6) that is about the same as the axial width $W_3$ measured between the inner ring surface 18 and the first seal surface 24 of the packing ring 19. In some embodiments, the first inserted ring 52A has an axial width $W_a$ that is about the same as the axial width $W_3$.

The axial width $W_a$ of the first inserted ring 52A may vary based, in part, on the axial width $W_1$ of the steam joint 17. When installed, the first inserted ring 52A at least partially contacts the first seal face 24 of the first groove 22 such that a seal is formed between the first seal face 24 of the first groove 22 and the first seal face 60 of the first inserted ring 52A. The first inserted ring 52A also at least partially contacts the second seal face 26 of the first groove 22 such that a seal is formed between the second seal face 26 of the first groove 22 and the second seal face 62 of the first inserted ring 52A. In some instances, the first inserted ring 52A at least partially contacts the first seal face 24 and the second seal face 26 of the first groove 22 such that a seal is formed between the first seal face 24 of the first groove 22 and the first seal face 60 of the first inserted ring 52A, and between the second seal face 26 of the groove 22 and the second seal face 62 of the first inserted ring 52A.

Referring to FIGS. 3 and 5, the second inserted ring 52B may be sized and shaped to be at least partially inserted within the second groove 29 of the packing ring 19. The distance $D_3$ between the second seal face 33 and the third face 35 of the second groove 29 may be equal to or larger than a distance $D_2$ measured between the second face 62 and the third seal face 64 of the second inserted ring 52B (see, e.g., FIG. 6). The distance $D_2$ between the second face 62 and the third seal face 64 of the second inserted ring 52B may be about the same as, or smaller than, the distance $D_3$ between the second face 33 and the third seal face 35 of the second groove 29. The second inserted ring 52B may have an axial width $W_a$ (see, e.g., FIG. 6) that is about the same as the axial width $W_6$ measured between the inner ring surface 18 and the first seal surface 31 of the packing ring 19. In some embodiments, the second inserted ring 52B has an axial width $W_a$ that is about the same as the axial width $W_6$.

The axial width $W_a$ of the second inserted ring 52B may vary based, in part, on the axial width $W_4$ of the joint 42. When installed, the second inserted ring 52B at least partially contacts the first seal face 31 of the second groove 29 such that a seal is formed between the first seal face 31 of the second groove 29 and the first seal face 60 of the second inserted ring 52B. The second inserted ring 52B also at least partially contacts the third seal face 35 of the second groove 29 such that a seal is formed between the third seal face 35 of the second groove 29 and the third seal face 64 of the second inserted ring 52B. In some instances, the second inserted ring 52B at least partially contacts the first seal face 31 and the third seal face 35 of the second groove 29 such that a seal is formed between the first seal face 31 of the second groove 29 and the first seal face 60 of the second inserted ring 52B, and between the third seal face 35 of the second groove 29 and the third seal face 64 of the second inserted ring 52B.

The inserted ring(s) 52 may be held in place within the first groove 22 and/or the second groove 29 using a variety of techniques, including but not limited to, peening, welding, adhesives, press fitting, pinning, and combinations thereof. In some instances, different techniques may be utilized within the steam turbine assembly 10. FIG. 3 illustrate the steam turbine assembly 10 including different techniques for securing each of the inserted rings 52 within the corresponding groove 22, 29. Notwithstanding, the various installation techniques, as they relate to the upstream and downstream grooves 22, 29, are in no way intended to be limiting and merely illustrate various embodiments. Thus, different installation techniques may be used for retaining the inserted ring(s) 52 within one or both of the first and second grooves 22, 29. The installation technique for retaining the inserted ring 52 within the first groove 22 is not limited to the pinning technique, as shown in FIGS. 3 and 4. The installation technique for retaining inserted ring 52 within the second groove 29 is not limited to the peening technique, as shown in FIGS. 3 and 5.

In some embodiments and as shown in FIGS. 3 and 4, the installation technique for retaining the first inserted ring 52A within the first groove 22 is the pinning technique. The first inserted ring 52A further defines a through hole 56 that extends along the axial width $W_a$ of the body 54. The through hole 56 is sized and shaped to receive a pin 58, such as a slotted spring pin, dowel pin. The pin 58 may have a diameter that is equal to or larger than the diameter of the through hole 56. The pin 58 may define a length, in the direction of the axial width $W_a$, that is equal to, longer than, or shorter than the axial width $W_a$. The pin 58 may be positioned within the through hole 56 of the first inserted ring 52A and in proximity to the surface 18 of the inner ring 16. Insertion of the pin 58 within the through hole 56 of the first inserted ring 52A may cause the second seal face 62 and the third face 64 of the inserted ring 52 to spread away from each other and in contact with the corresponding second seal face 26 and third face 28 of the first groove 22. Thus, insertion of the pin 58 within the through hole 56 of the first inserted ring 52A aids in retaining the first inserted ring 52A within the first groove 22. In some instances, two or more pins 58 may be utilized to retain the first inserted ring 52A within the first groove 22. The pin 58 may be selected from a variety of pins 58, such as a pinch pin.

In some embodiments and as shown in FIGS. 3 and 5, the installation technique for retaining the second inserted ring 52B within the second groove 29 is the peening technique. For example, the second inserted ring 52B is peened such that a portion 68 of the second face 33 of the packing ring 19 is deformed in the direction of the second face 62 of the second inserted ring 52B (FIG. 5). The deformed portion 68 at least partially retains the second inserted ring 52B within the second groove 29 of the packing ring 19. In one embodiment, to create the peened area 68, a peening tool (not shown), such as, for example, a punch, an impact hammer, or the like, is directed at an angle relative to the second seal face 33 of the packing ring 19.

Figure 8:
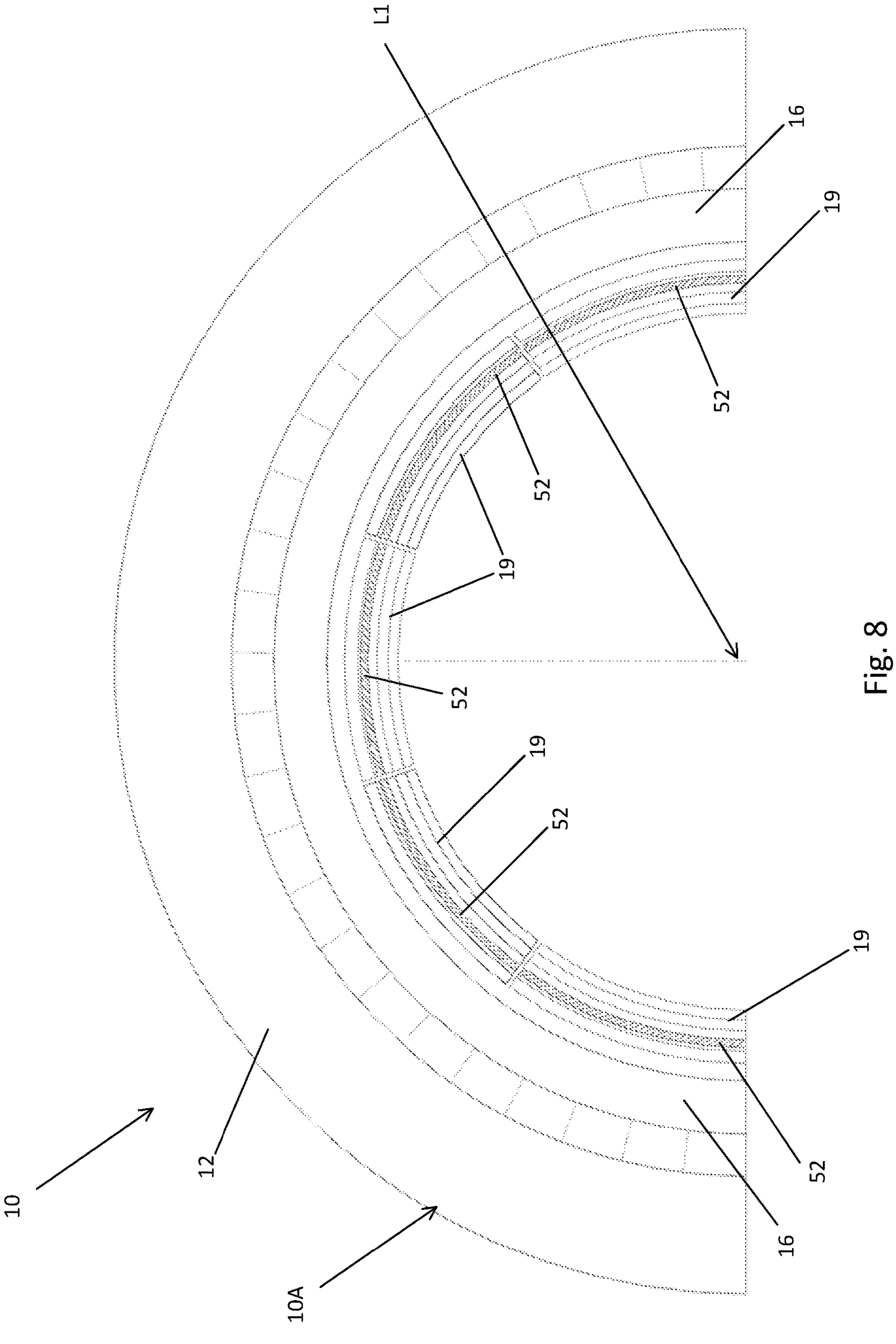
FIG. 8 is a top schematic illustration of a first half of the exemplary steam turbine assembly including a plurality of inserted rings as shown in FIG. 2 and taken along line A-A.

Although depicted with only one first inserted ring 52A within the first groove 22 and one second inserted ring 52B within the second groove 29, it should be understood that a plurality of inserted rings 52 may be used. For example, as shown in FIG. 8, in the exemplary embodiment, the steam turbine assembly 10 includes a plurality of inserted rings 52 that are positioned axially relative to a longitudinal axis ($L_1$). The plurality of inserted rings 52 may be selectively positioned at various circumferential locations relative to the longitudinal axis ($L_1$). For example, in one embodiment, a first half 10A of the steam turbine assembly 10 may include a first quantity of inserted rings 52, and a second half (not shown) of the steam turbine assembly 10 may include a second quantity of inserted rings 52. FIG. 8 depicts a downstream view of the first half 10A of the steam turbine assembly 10 taken along line A-A of FIG. 2. FIG. 8 illustrates the plurality of packing segments 19 positioned axially relative axis ($L_1$) and in proximity to the inner ring 16. The plurality of inserted rings 52 are depicted in cross-hatching and are positioned in proximity to the packing segment 19. The first and second quantities of inserted rings 52 may be the same or may be different. It should be understood that various quantities of inserted rings 52 may be used, without departing from the spirit/scope of this disclosure. For example, the first half 10A of the steam turbine assembly 10 may include one or more inserted rings 52 and the second half 10B of the steam turbine assembly 10 may include one or more inserted rings 52.

Figure 9:
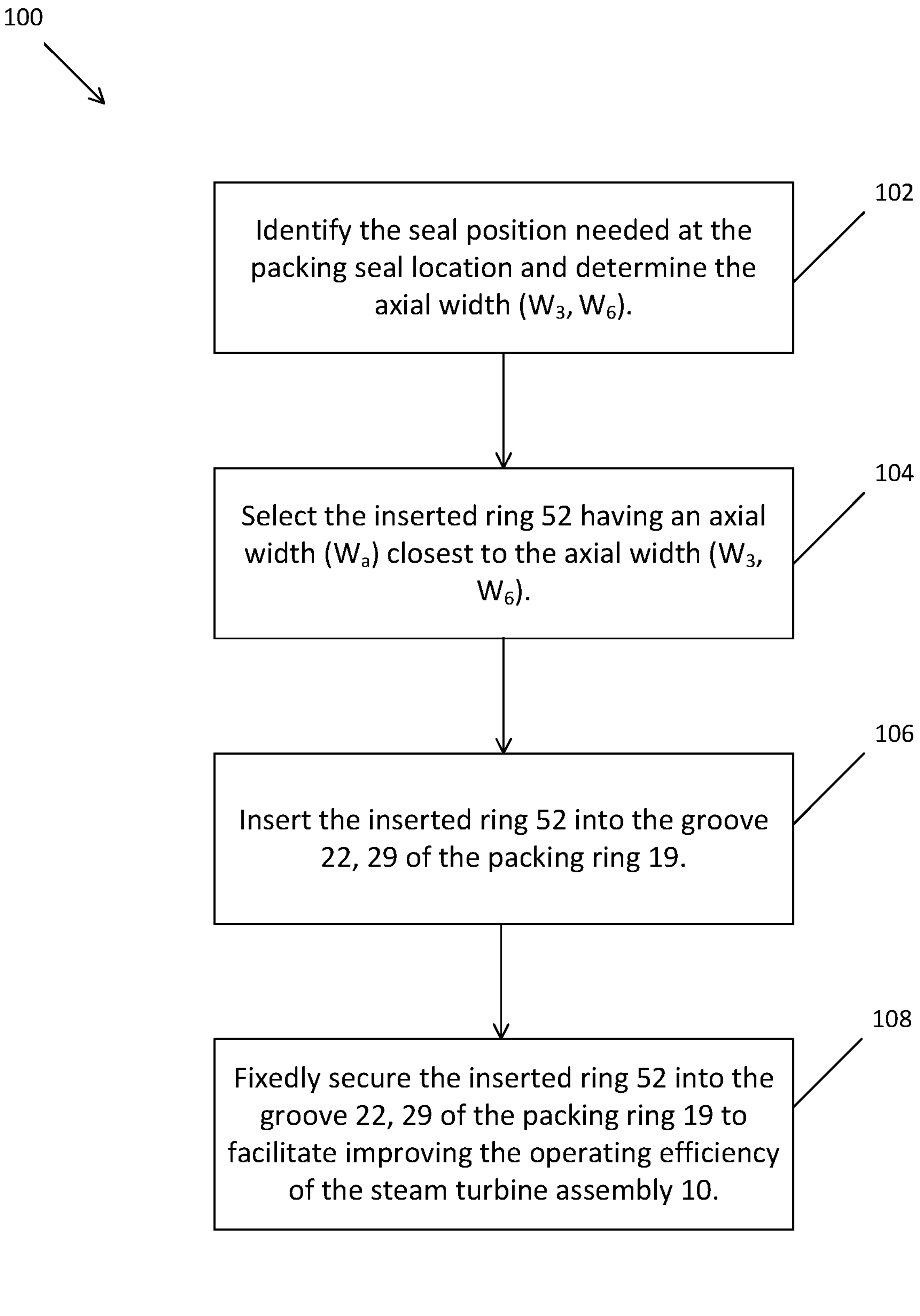
FIG. 9 is a flow chart illustrating an exemplary method that may be implemented to identify and insert an inserted ring and/or pin into a steam turbine assembly, such as the steam turbine assembly shown in FIGS. 3 and 7.

In operation (FIG. 9), in the exemplary method 100 of using the inserted ring 52, identify 102 the seal position required at the packing seal location relative to the packing ring 19 and identify the axial width $W_3$, $W_6$, which is measured between the surface 18 of the inner ring 16 and the first seal surface 24, 31 of the packing ring 19. The preferred seal position is based on the axial distance 27' between the protrusion 21 of the packing ring 19 and the protrusions 25' of the rotor 23'. The axial distance 27' may vary based, in part, on the selected turbine. A corresponding inserted ring 52 is selected 104 that has an axial width $W_a$ that is approximately the same as, or slightly smaller than the measured axial width $W_3$, $W_6$. The inserted ring 52 is then inserted 106 at least partially into the first groove 22 and/or the second groove 29 defined within the packing ring 19. The inserted ring 52 is fixedly secured 108 within the first groove 22 and/or the second groove 29 of the packing ring 19 to facilitate improving the operating efficiency of the steam turbine assembly 10. To ensure the inserted ring 52 remains in place during assembly of the steam turbine assembly 10, the inserted ring 52 is held in place, as described herein.

Referring to FIG. 6, the body 54 of the inserted ring 52 has an axial width $W_a$. The inserted ring 52 may be available in a variety of standard sizes, as defined at least partially by the axial width $W_a$. The variety of standard sizes may be incrementally sized such that the axial width $W_a$ of the inserted ring is in a range of between about 0.15 inches to about 0.50 inches. The axial width $W_a$ of the body 54 may vary and may depend, in part, on the overall size of the steam turbine assembly 10.

In some instances, the body 54 of the inserted ring 52 may include a plurality of inserts (not shown). Each insert (not shown) may include a tear line (not shown) that enables one or more of the inserts (not shown) to be selectively removed from the plurality of inserts (not shown). The tear line (not shown) may indicate an area of reduced material wherein at least one or more of the inserts (not shown) may be selectively separated from the plurality of inserts (not shown). In some instances, the tear line (not shown) is not visible, but rather is created by removing one or more of the inserts (not shown) from the plurality of inserts (not shown). For example, in some embodiments the tear line (not shown) is created by removing at least one insert (not shown) via bending, cutting, or the like. It should be understood, however, that alternatives to the tear line (not shown) may be used, without departing from the spirit/scope of this disclosure.

Figure 7:
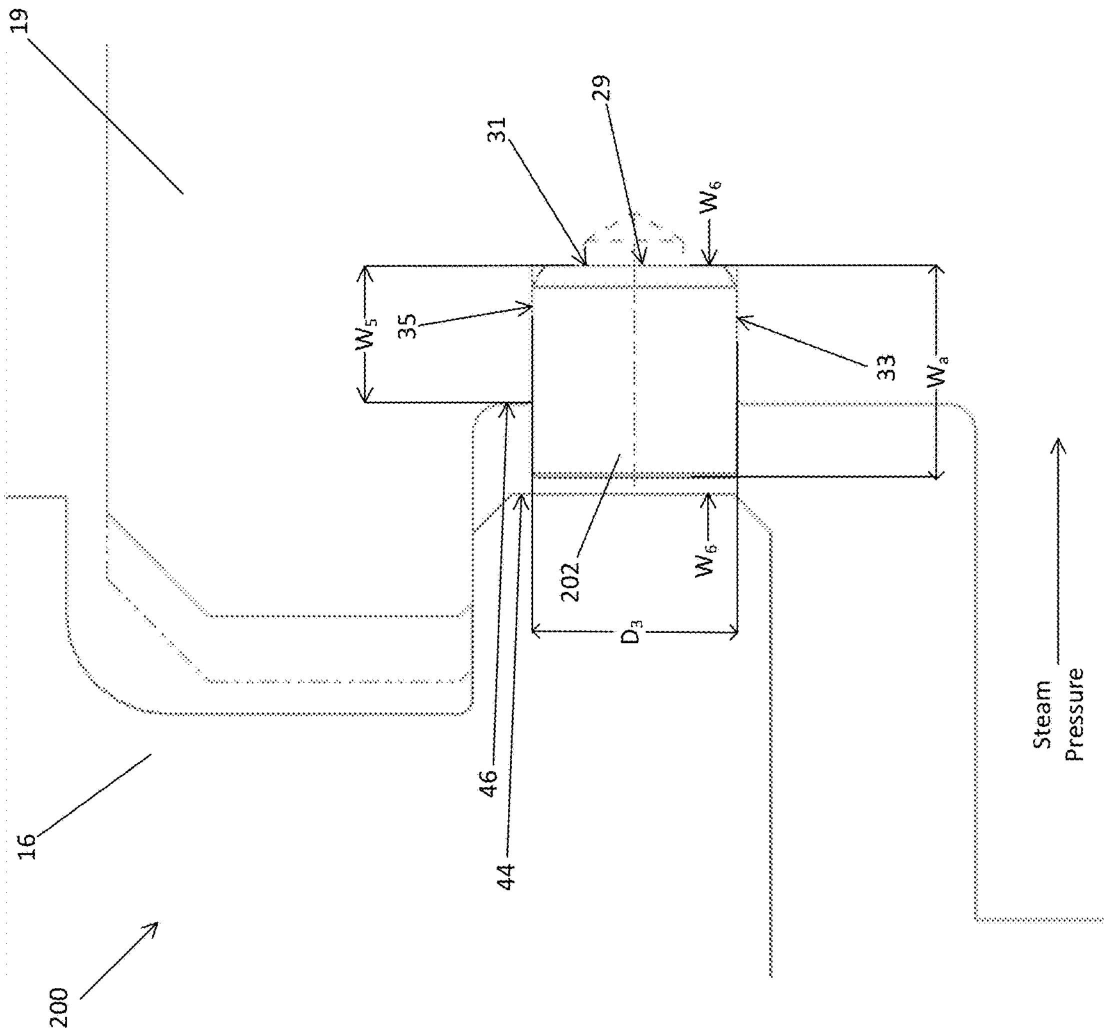
FIG. 7 is a cross-sectional illustration of an exemplary steam turbine assembly including an inserted pin.

FIG. 7 is a cross-sectional view of an exemplary steam turbine assembly 200 including an inner ring 16 and a packing ring 19 that is positioned relative to the inner ring 16. It should be understood that identical components are identified in FIG. 7 using the same reference numbers as used in FIGS. 2, 3, and 5. The packing ring 19 includes a groove 29 that is open to the joint 42, as best seen in FIG. 5. The packing ring 19 includes a first seal face 31 that is defined opposite the joint 42. The packing ring 19 defines a second seal face 33 that is adjacent to the first seal face 31. The packing ring 19 also includes a third face 35 that is defined opposite the second seal face 33. The first seal face 31, the second seal face 33, and the third face 35 define, at least in part, the groove 29.

The steam turbine assembly 200 includes an inserted pin 202 that is sized and shaped to at least partially be inserted within the groove 29, either directly or indirectly. More specifically, the inserted pin 202 may be press-fit within the groove 29 so as to directly or indirectly contact the first seal face 31, the second seal face 33, and the third face 35 of the groove 29. The pin 202 has an axial width $W_a$. The inserted pin 202 has an axial width $W_a$ that is less than the axial width $W_6$. The axial gap between the pin 202 and the groove 29 may be between about 0.2 inches to about 1 inch. It should be understood that the method described and illustrated with reference to FIG. 9 may be modified to include the inserted pin 202. For example, the second inserted ring 52B may be replaced by at least one inserted pin 202. In some instances, two inserted pins 202 may be inserted within the second groove 29.

At least some of the advantages of the systems described herein, over the prior art, include, at least: (i) selective adjustments of the axial position of the inserted ring/plate; (ii) incremental adjustments of the inserted ring/plate for ease of repair; (iii) reduced downtime of the rotating machinery; and (iv) reduced analysis required to select an appropriate inserted ring/plate based on a determined axial width between components of the rotating machinery.

The systems described herein enable the steam turbine assembly 10 and 200 to be refurbished, thereby reducing the extent the system is not fully operational and, in some cases, entirely removed from use. In some instances, for example in the power generation industry, refurbishment of the steam turbine assembly 10 and 200 may reduce the extent of an outage and save the user and/or the energy provider money based, in some part, on the extent of the outage.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems described herein are not limited to the specific embodiments described herein, but rather portions of the various systems may be utilized independently and separately from other systems described herein.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the invention are provided by the subject matter of the following clauses:

Clause 1. An inserted ring for a turbine assembly, wherein the turbine assembly includes a turbine stationary component, the turbine stationary component includes an inner ring and a packing segment positioned relative to the inner ring such that the inner ring and the packing segment define a steam joint therebetween, the inserted ring including: a first face positioned adjacent to the inner ring; and a second face positioned in close proximity to the packing segment such that the second face is spaced a distance from and opposite to the first face, wherein the inserted ring has an axial width defined by the first and second faces.

Clause 2. The inserted ring for a turbine assembly according to any of the proceeding clauses, wherein the inserted ring includes a pin that is positioned within an opening of the inserted ring, the pin configured to at least partially retain the inserted ring relative to the inner ring and the packing segment.

Clause 3. The inserted ring for a turbine assembly according to any of the proceeding clauses, wherein the packing segment includes a groove defined therein that opens towards the steam joint, wherein the inserted ring is sized to be inserted at least partially within the groove of the packing segment.

Clause 4. The inserted ring for a turbine assembly according to any of the proceeding clauses, wherein the packing segment includes a first seal face opposite from the portion of the groove that opens towards the steam joint, wherein the second face of the inserted ring at least partially contacts the first seal face of the turbine stationary component.

Clause 5. The inserted ring for a turbine assembly according to any of the proceeding clauses, wherein the inserted ring defines a body that has an axial width $W_a$ that is in a range between about 0.15 inches and about 0.50 inches.

Clause 6. The inserted ring for a turbine assembly according to any of the proceeding clauses, wherein the groove is a first groove, the packing segment further includes a second groove oppositely positioned from the first groove, wherein the second groove opens towards a second steam joint defined between the inner ring and the packing segment, the second groove is configured to at least partially receive a second inserted ring.

Clause 7. The inserted ring for a turbine assembly according to any of the proceeding clauses, wherein the packing segment defines a second seal face that is adjacent to the first seal face, wherein the second face of the inserted ring at least partially contacts the first seal face of the packing segment and a third face of the inserted ring at least partially contacts the second seal face of the packing segment.

Clause 8. The inserted ring for a turbine assembly according to any of the proceeding clauses, wherein the turbine assembly further comprises a biasing member that is positioned between the inner ring and the packing segment.

Clause 9. A turbine assembly including an inner ring and a packing segment positioned relative to the inner ring such that the inner ring and the packing segment define a steam joint therebetween, the packing segment defines a groove open to the steam joint, the packing segment defines a first seal face within the groove and opposite from the portion open to the steam joint, and a second seal face within the groove and adjacent to the first seal face, the turbine assembly including an inserted ring, the inserted ring including: a body including a first face, a second face adjacent to the first face, and a third face opposite from the first face, wherein the first face is positioned in close proximity to the first seal face of the packing segment, the second face is positioned in close proximity to the second seal face of the packing segment, and the third face is positioned in close proximity to the inner ring.

Clause 10. The turbine assembly according to any of the proceeding clauses, wherein the body of the inserted ring has an axial width $W_a$ in a range between about 0.25 inches to about 0.50 inches.

Clause 11. The turbine assembly according to any of the proceeding clauses, wherein the body of the inserted ring has an axial width $W_a$ that is in a range between about 0.15 inches and about 0.50 inches.

Clause 12. The turbine assembly according to any of the proceeding clauses, wherein the inserted ring is fixedly secured within the groove of the packing segment by peening, welding, adhesives, press fitting, pinning, and combinations thereof.

Clause 13. The turbine assembly according to any of the proceeding clauses, wherein a biasing member is positioned between the inner ring and the packing segment.

Clause 14. The turbine assembly according to any of the proceeding clauses, wherein the groove is a first groove, the packing segment further includes a second groove oppositely positioned from the first groove, wherein the second groove opens towards a second steam joint defined between the inner ring and the packing segment, the second groove is configured to at least partially receive a second inserted ring.

Clause 15. The turbine assembly according to any of the proceeding clauses, wherein the inserted ring includes a pin that is positioned within an opening of the inserted ring, the pin is configured to fixedly retain the inserted ring within the groove of the packing segment.

Clause 16. The turbine assembly according to any of the proceeding clauses, wherein the biasing member is selected from the group consisting of a radial spring, a coil spring, or a leaf spring.

Clause 17. A method for selectively positioning an inserted ring relative to a turbine assembly that includes an inner ring and a packing segment positioned relative to the inner ring such that the inner ring and the packing segment define a steam joint therebetween, the method including: identifying a seal position required at a packing seal location and identifying an axial width defined between a first seal face of the packing segment and a radially inner surface of the inner ring; selecting an inserted ring having an axial width that is approximately the same as the axial width identified between the first seal face of the packing segment and the radially inner surface of the inner ring; inserting the inserted ring at least partially within a groove defined circumferentially within the packing segment; and fixedly securing the inserted ring within the groove of the packing segment to facilitate improving the operating efficiency of the turbine assembly.

Clause 18. The method according to any of the proceeding clauses, wherein selecting an inserted ring further includes selecting an inserted ring that includes a body that is positioned relative to the radially inner surface of the inner ring.

Clause 19. The method according to any of the proceeding clauses, wherein selecting an inserted ring further includes selecting an inserted ring that includes a body that has an axial width Wa that is in a range between about 0.15 inches and about 0.50 inches.

Clause 20. The method according to any of the proceeding clauses, wherein selecting an inserted ring further includes selecting an inserted ring that includes a first face and a second face adjacent to the first face, wherein the first face of the inserted ring is positioned in close proximity to the first seal face of the packing segment and the second face of the inserted ring is positioned in close proximity to a third seal face adjacent to the first seal face of the packing segment, the first and second faces of the inserted ring combine to produce a seal relative to the packing segment.

While the invention has been described in terms of various specific embodiments, those skilled in the art will recognize that the invention can be practiced with modification within the spirit and scope of the claims.

What is claimed is:

1. An inserted ring for a turbine assembly, wherein the turbine assembly comprises a turbine stationary component, the turbine stationary component comprises an inner ring and a packing segment including a base segment, a hook base segment contacting the inner ring, and a neck segment extending between the base segment and the hook base segment, wherein the inner ring and the packing segment define a steam joint therebetween, and the inserted ring comprising:

a first face positioned adjacent to the inner ring; and a second face positioned within a groove formed in the neck segment of the packing segment and radially spaced apart from the base segment and the hook base segment, the second face is spaced a distance from and opposite to the first face, wherein the inserted ring has an axial width defined by the first and second faces, and wherein the inserted ring is radially spaced apart from the base segment and the hook base segment of the packing segment.

2. The inserted ring for the turbine assembly according to claim 1, wherein the inserted ring comprises a pin that is positioned within an opening of the inserted ring, the pin configured to at least partially retain the inserted ring relative to the inner ring and the packing segment.

3. The inserted ring for the turbine assembly according to claim 1, wherein the groove of the packing segment opens towards the steam joint, wherein the inserted ring is sized to be inserted at least partially within the groove of the packing segment.

4. The inserted ring for the turbine assembly according to claim 1, wherein the packing segment comprises a first seal face within the groove and opposite from a portion of the groove that opens towards the steam joint, wherein the second face of the inserted ring at least partially contacts the first seal face of the packing segment.

5. The inserted ring for the turbine assembly according to claim 4, wherein the packing segment defines a second seal face that is adjacent to the first seal face, wherein the second face of the inserted ring at least partially contacts the first seal face of the packing segment and a third face of the inserted ring at least partially contacts the second seal face of the packing segment.

6. The inserted ring for the turbine assembly according to claim 1, wherein the axial width $W_a$ is in a range between 0.15 inches and 0.50 inches.

7. The inserted ring for the turbine assembly according to claim 1, wherein the groove is a first groove, the packing segment further comprises a second groove oppositely positioned from the first groove, wherein the second groove opens towards a second steam joint defined between the inner ring and the packing segment, the second groove is configured to at least partially receive a second inserted ring.

8. The inserted ring for the turbine assembly according to claim 1, wherein the turbine assembly further comprises a biasing member that is positioned between the inner ring and the packing segment.

9. A turbine assembly comprising an inner ring and a packing segment including a base segment, a hook base segment contacting the inner ring, and a neck segment extending between the base segment and the hook base segment, wherein the inner ring and the packing segment define a steam joint therebetween, the packing segment includes a groove formed in the neck segment and radially spaced apart from the base segment and the hook base segment, the packing segment defines a first seal face within the groove and opposite from a portion open to the steam joint, and a second seal face within the groove and adjacent to the first seal face, the turbine assembly comprising an inserted ring, the inserted ring comprising:

a body including a first face, a second face adjacent to the first face, and a third face opposite from the first face, the body within the groove and radially spaced apart from the base segment and the hook base segment of the packing segment, wherein the first face is positioned in close proximity to the first seal face of the packing segment, the second face is positioned in close proximity to the second seal face of the packing segment, and the third face is positioned in close proximity to the inner ring.

10. The turbine assembly according to claim 9, wherein the body of the inserted ring has an axial width $W_a$ in a range between 0.25 inches to 0.50 inches.

11. The turbine assembly according to claim 9, wherein the body of the inserted ring has an axial width $W_a$ that is in a range between 0.15 inches and 0.50 inches.

12. The turbine assembly according to claim 9, wherein the body of the inserted ring is fixedly secured within the groove of the packing segment by peening, welding, adhesives, press fitting, pinning, or combinations thereof.

13. The turbine assembly according to claim 9, wherein a biasing member is positioned between the inner ring and the packing segment.

14. The turbine assembly according to claim 13, wherein the biasing member is selected from a group consisting of a radial spring, a coil spring, or a leaf spring.

15. The turbine assembly according to claim 13, wherein the packing segment further includes a recessed portion formed in the hook base segment, the recessed portion sized and oriented to receive the biasing member.

16. The turbine assembly according to claim 9, wherein the groove is a first groove, the packing segment further comprises a second groove oppositely positioned from the first groove, wherein the second groove opens towards a second steam joint defined between the inner ring and the packing segment, the second groove is configured to at least partially receive a second inserted ring.

17. The turbine assembly according to claim 9, wherein the inserted ring comprises a pin that is positioned within an opening of the inserted ring, the pin is configured to fixedly retain the inserted ring within the groove of the packing segment.

18. The turbine assembly according to claim 17, wherein the opening of the inserted ring extends axially between the packing segment and the inner ring.

19. The turbine assembly according to claim 18, wherein the pin extends axially between the neck segment of the packing segment and the inner ring.

20. The turbine assembly according to claim 9, wherein the body of the inserted ring further comprises an angled feature formed between the second face and the third face.

* * * * *